(12) United States Patent
Kaku

(10) Patent No.: US 7,924,664 B2
(45) Date of Patent: Apr. 12, 2011

(54) OPTICAL DISK APPARATUS, OPTICAL HEAD, AND DETECTION SIGNAL PROCESSING METHOD THEREOF

(75) Inventor: Toshimitsu Kaku, Sagamihara (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 629 days.

(21) Appl. No.: 10/795,171

(22) Filed: Mar. 5, 2004

(65) Prior Publication Data

US 2004/0264315 A1    Dec. 30, 2004

(30) Foreign Application Priority Data

Jun. 26, 2003    (JP) ................... 2003-181943

(51) Int. Cl.
*G11B 7/12*    (2006.01)
(52) U.S. Cl. .............. 369/44.12; 369/44.34; 369/47.2
(58) Field of Classification Search ............ 369/44.12, 369/44.34, 59.21, 116, 59.34, 53.34, 47.35, 369/124.05, 47.2, 107; *G11B 7/00*
See application file for complete search history.

(56) References Cited

U.S. PATENT DOCUMENTS

| | | | | |
|---|---|---|---|---|
| 5,570,330 A * | 10/1996 | Okawa | ........ | 369/44.32 |
| 5,748,658 A * | 5/1998 | Nakanishi et al. | ........ | 372/43.01 |
| 6,434,087 B1 * | 8/2002 | Schell et al. | ........ | 369/13.02 |
| 6,560,172 B1 * | 5/2003 | Nakajo | ........ | 369/44.13 |
| 6,603,548 B2 * | 8/2003 | Church et al. | ........ | 356/326 |
| 6,636,465 B2 * | 10/2003 | Kobayashi | ........ | 369/44.26 |
| 6,721,261 B2 * | 4/2004 | Kaku et al. | ........ | 369/116 |
| 2001/0006503 A1 * | 6/2001 | Braitberg et al. | ........ | 369/77.2 |
| 2001/0028607 A1 * | 10/2001 | Ashinuma | ........ | 369/14 |
| 2003/0117938 A1 * | 6/2003 | Braitberg et al. | | |
| 2004/0179451 A1 * | 9/2004 | Morishima et al. | ........ | 369/59.11 |

FOREIGN PATENT DOCUMENTS

| | | |
|---|---|---|
| JP | 07-320282 | 8/1995 |
| JP | 2001-143297 A | 5/2001 |
| JP | 2001-291261 A | 10/2001 |
| JP | 2001-307345 A | 11/2001 |
| JP | 2002-025104 A | 1/2002 |
| JP | 2002-298372 A | 10/2002 |

OTHER PUBLICATIONS

Japan Patent Office (JPO) office action for JPO patent application JP2004-049946 (Sep. 2, 2008).

* cited by examiner

*Primary Examiner* — Wayne R Young
*Assistant Examiner* — Thomas D Alunkal
(74) *Attorney, Agent, or Firm* — Kilpatrick Townsend & Stockton LLP

(57) ABSTRACT

Disclosed herein is a technology that enables stable and high-speed writing and/or reading in an optical disk apparatus. The optical disk apparatus has an optical head that includes a first circuit for driving a laser diode, a second circuit for sampling and holding analog electric signals that are based on reflected laser light from the optical disk, and a third circuit for converting said signals being sampled and held into digital signals. Signals digitized in the optical head are transmitted to the apparatus body side using time-division multiplexing. The first circuit, the second circuit, and the third circuit are constructed on a single substrate or in a single IC.

9 Claims, 3 Drawing Sheets

US 7,924,664 B2

OPTICAL DISK APPARATUS, OPTICAL HEAD, AND DETECTION SIGNAL PROCESSING METHOD THEREOF

BACKGROUND OF THE INVENTION

1. Field of the Invention

This invention relates to an optical disk apparatus, especially to its signal processing technology for supporting high-speed writing and reading.

2. Description of the Related Art

As the conventional technology relevant to this invention, for example, there is a technology described in JP-A-7-320282, "Information recorder". The material gives a description of the outline of an optical head that is constructed to include an amplifier equipped with two sample-and-hold circuits.

SUMMARY OF THE INVENTION

The described technology permits of outputting signals sampled and held, as analog signals, from the optical head. Where the detected signals from the optical head are transmitted to a control part on the apparatus body side as analog signals, the signal are liable to be affected by impedance, noises, etc. on a transmission path. This may cause waveform distortion.

The problem of this invention is, in consideration of a situation of the conventional technology, to enable an optical disk apparatus to transmit the detected signal from the optical head to the control part on the apparatus body side while the waveform distortion is being suppressed, so as to make the apparatus support high-speed writing.

This invention aims at providing a technology that can solve this problem point.

In one aspect, this invention resides in an optical disk apparatus which comprises an optical head including a first circuit for driving the laser diode, a second circuit for sampling and holding analog electric signals based on reflected laser light from the optical disk, and a third circuit for converting the signals sampled and held into digital signals.

In another aspect, the apparatus has a configuration in which the first circuit, the second circuit, and the third circuit are constructed on a single substrate or in a signal IC.

Specifically, this invention is directed to the optical head configured as described above, the optical disk apparatus, and a detection signal processing method of this apparatus, the method comprising the steps of: receiving reflected laser light from the optical disk and converting it into analog electric signals in an optical head; sampling and holding the analog electric signals in the optical head; converting the signals that are sampled and held into digital signals in the optical head; and transmitting the digital signals to a control part on the apparatus body side through a serial interface, whereby the detected signals from the optical head are processed.

DETAILED DESCRIPTION OF THE PREFERRED EMBODIMENTS

Figure 1:
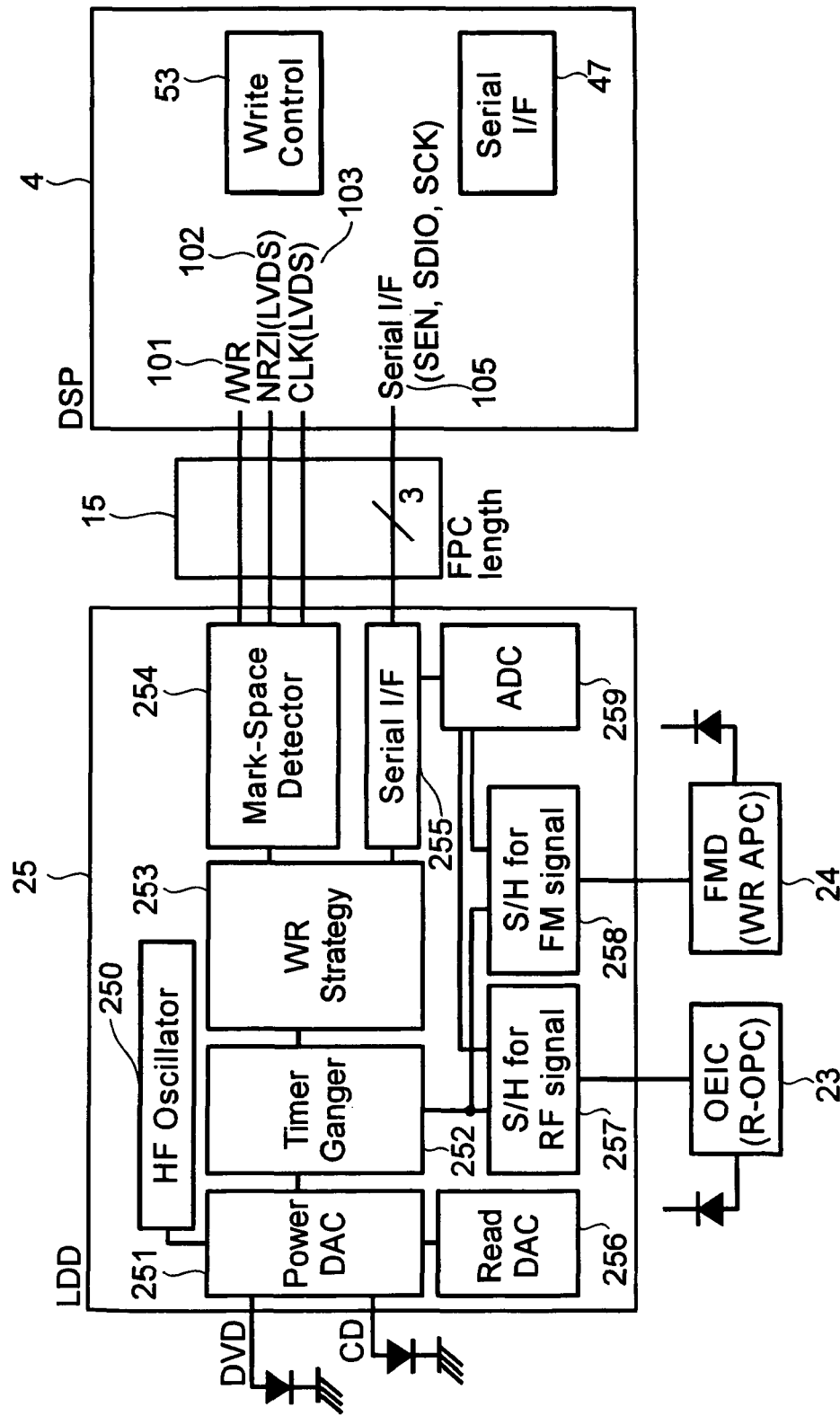
FIG. 1 shows an example of the circuit configuration in the optical head in the optical disk apparatus as a first embodiment of this invention.

Hereafter, embodiments of the invention will be described referring to the drawings.

FIG. 1 shows an example of the circuit configuration in the optical head in the optical disk apparatus as the first embodiment of this invention. This first embodiment is an example of a case where a circuit for sampling and holding an analog electric signal (hereinafter referred to as the sample and hold circuit) and a circuit for converting the analog electric signal into a digital signal are installed in the laser diode driver circuit (laser diode driver).

In FIG. 1, the reference numerals denote the following constituents or signals, respectively: the numeral 25 is a laser diode driver (LDD); the numeral 250 is a high frequency oscillator (HF oscillator); the numeral 251 is a Power DAC that outputs a writing/reading signal for a DVD optical disk and writing/reading signal for a CD optical disk to respective laser diodes; the numeral 252 is a Time Ganger for generating multiple pulses, the numeral 253 is a WR Strategy that determines timing to create a writing strategy and generate the multiple pulses; the numeral 254 is a Mark-Space Detector; the numeral 255 is a serial interface; the numeral 256 is a Read DAC for generating reading power; the numeral 257 is a sample and hold circuit for sampling and holding the reproduced signal (S/H for RF Signal); the numeral 258 is a sample and hold circuit for sampling and holding an output from a front monitor detector circuit (S/H for FM Signal); the numeral 259 is an analog-to-digital converter for converting outputs from the sample and hold circuits 257, 258 into digital signals; the numeral 23 is an IC (OEIC) for detecting a state of the optical system, the reproduced signal, and a servo signal (OEIC (R-OPC)); the numeral 24 is an FMD (Front Monitor Detector) for detecting a signal used to exercise laser power control (FMD (WR APC)); the numeral 4 is a DSP (Digital Signal Processor) as a control part; the numeral 53 is a Write Control in the DSP 4; the numeral 47 is a serial interface in the DSP 4; the numeral 15 is an FPC (Flexible Printed Circuit Board) for connecting the laser diode driver 25 and the DSP 4; the numeral 101 is a WR gate signal (/WR) that turns the laser diode driver 25 into a writable state during writing; the numeral 102 is an NRZI signal that is modulated data (NRZI (LVDS)); and the numeral 103 is a clock signal that is in synchronization with the NRZI signal 102 (CLK (LVDS)).

The NRZI signal 102 and the clock signal 103 are connected with an interface based on LVDS (Low Voltage Differential Signaling) in order that these signals allow speed enhancement, respectively. All of the laser diode driver 25, the OEIC 23, and the FMD 24 are installed in the optical head, whereas the DSP 4 is installed in a main board on the apparatus body side (not shown). The laser diode driver 25 is constructed as a single IC in the optical head, and shall be incorporated in a single substrate together with the OEIC 23 and the FMD 24. The high frequency oscillator 250, the Power DAC 251, the Time Ganger 252, and the WR Strategy 253 correspond to the first circuit; the sample and hold circuits 257, 258 correspond to the second circuit; the analog-to-digital converter circuit 259 corresponds to the third circuit; the OEIC 23 corresponds to the fourth circuit; and the FMD 24 corresponds to the fifth circuit.

In the configuration described above, when in writing, the detected signal (analog signal) from the OEIC 23 is inputted into the sample and hold circuit 257 and is sampled and held by the sample and hold circuit 257. Subsequently, it is inputted into the analog-to-digital converter 259 and is converted into a digital signal that is time-division multiplexed by the analog-to-digital converter 259. Moreover, the detected signal (analog signal) from the FMD 24 is inputted into the sample and hold circuit 258 and is sampled and held by the sample and hold circuit 258. Subsequently, it is inputted into the analog-to-digital converter 259 and is converted into a digital signal that is time-division multiplexed by analog to digital conversion. These converted digital signals are transmitted to the DSP 4 side using time-division multiplexing through a serial interface 255. The DSP 4 forms a control signal by exchanging information between itself and a microcomputer (not shown) etc. The control signal is transmitted to the laser diode driver 25 via the FPC15.

The WR gate signal/WR 101, the NRZI signal 102, and the clock signal 103 are inputted into the Mark-Space Detector 254 in the laser diode driver 25, respectively, and the Mark-Space Detector 254 detects temporal length of a mark of the NRZI signal 102. The WR Strategy 253 determines timing to generate the multiple pulses that correspond to the temporal length of the mark. The Time Ganger 252 generates the multiple pulses according to the timing. The multiple pulses are inputted into the Power DAC 251, which outputs a writing/reading signal for DVD optical disk and a writing/reading signal for CD optical disk to respective laser diodes based on the multiple pulses. Each laser diode generates laser light according to the writing/reading signal, respectively. The laser light is focused by the optical system (and undergoes other processing) and is irradiated on the recording surface of the optical disk (not shown) to effect writing on the recording surface. Reproduction power generated by the Read DAC 256 is superposed on the multiple pulses via the Power DAC 251. The multipulse technique is adopted to divide recording power into multiple pulses so that the apparatus becomes able to support high-speed writing and write marks or pits to be formed on the optical disk with a high density. The level of the pulse is varied to one of multiple values (for example, binary to 4-valued).

The Time Ganger 252 generates timing signals used for sampling and holding analog signals in the sample and hold circuits 257, 258. The timing signals from the Time Ganger 252 are set up in consideration of delay times to be introduced by the OEIC 23 and the FMD 24, respectively. The serial interface 105 (serial I/F (SEN, SDIO, SCK)) consists of transmission paths for an enable signal (SEN), a clock signal (SCK), and a data signal (SDIO). The data are bi-directional signals. The signal from the OEIC 23 is used for a running OPC (R-OPC). The signal from the FMD 24 is used for write power control (WRAPC) during writing. The two signals are required to be high frequency response, because it is necessary for outputs of the OEIC 23 corresponding to the R-OPC to respond to high-speed change due to sensitivity unevenness depending on a position in the optical disk, fingerprints, etc. On the other hand, for the response of the WRAPC to change in I-L characteristics caused by temperature change of a laser diode, it is sufficient for the WRAPC to have low frequency response. Therefore, regarding a switching ratio of the quantity of data to be transmitted to the main substrate through the serial interface, it is sufficient to satisfy an inequality of "quantity of data of RF>quantity of data of FMD." The quantity of data per unit time of the FMD may be at least an order of magnitude slower than that of the RF.

Figure 2:
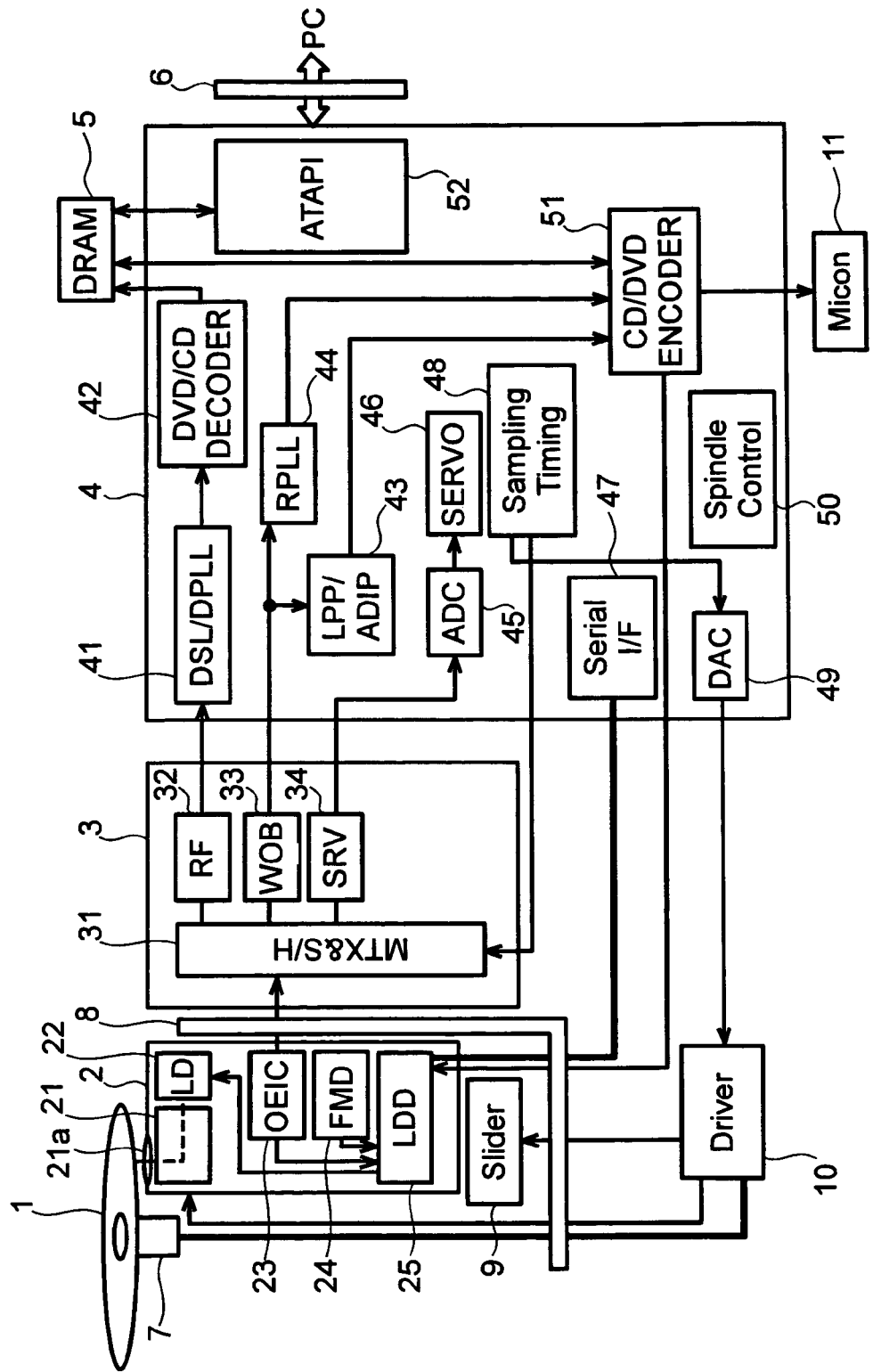
FIG. 2 shows an example of the entire configuration of the optical disk apparatus that uses the optical head in FIG. 1.

FIG. 2 shows an example of the overall circuit configuration of the optical disk apparatus that uses the optical head of FIG. 1.

In FIG. 2, the reference numerals denote the following constituents or signals, respectively: the numeral 1 is an optical disk; the numeral 2 is an optical head; the numeral 3 is an analog front end (AFE) incorporated in the main board on the apparatus body side; the numeral 4 is a DSP; the numeral 5 is DRAM; the numeral 6 is a connector; the numeral 7 is a spindle motor for making the optical disk rotate; the numeral 8 is a connector; the numeral 9 is a slider for moving the optical head 2 in a radial direction of the optical disk 1; the numeral 10 is a driver that forms driving signals for driving the spindle motor 7, the motor for driving slider 9, and an actuator; the numeral 11 is a micro computer (Micon); the numeral 21 is an optical system in the optical head 2; the numeral 21a is an objective lens in the optical system 21; the numeral 22 is a laser diode (LD); the numeral 23 is an OEIC; the numeral 24 is an FMD; the numeral 25 is the laser diode driver (LDD) of the configuration shown in FIG. 1 referred to above; the numeral 31 is an operation part for conducting data processing of various signals in the AFE 3 (MTX&S/H); the numeral 32 is a reproduced-signal processing part (RF); the numeral 33 is a wobble signal processing part (WOB); the numeral 34 is a servo signal processing part (SRV); the numeral 41 is a DSL/DPLL circuit for binarizing a RF signal (analog signal) and subsequently converting it into a synchronized digital signal (DSL/DPLL); the numeral 42 is a DVD/CD Decoder for demodulating a DVD signal or CD signal; the numeral 43 is a LPP/ADIP circuit for detecting ADIP (Address Data in Pre-pit) of address data contained in a wobble signal; the numeral 44 is a RPLL (Phase Locked Loop for Reference Clock) circuit for generating a reference clock; the numeral 45 is an analog-to-digital converter for converting the servo signal into a digital signal; the numeral 46 is a servo circuit (SERVO); the numeral 47 is a serial interface; the numeral 48 is a sampling-timing signal generating circuit; the numeral 49 is a digital-to-analog converter for converting a digital signal into an analog signal; the numeral 50 is a motor control circuit for controlling rotation of the spindle motor 7 (Spindle Control); the numeral 51 is a CD/DVD Encoder for supplying NRZI signals required for writing to the laser diode driver 25; and the numeral 52 is an ATAPI circuit. The optical system 21, the laser diode 22, the OEIC 23, the FMD 24, and the laser diode driver 25 are constructed in the optical head 2. The laser diode driver 25 has a configuration of FIG. 1 referred to above, and is equipped with the sample and hold circuits 257, 258 and the analog-to-digital converter 259 within its interior.

In the configuration described above, the optical disk 1 is made to rotate by the spindle motor 7 either in the CAV (Constant Angular Velocity) control state or in the CLV (Constant Linear Velocity) control state. A rotation state of the spindle motor 7 is controlled by the motor control circuit 50 and the driver 10. The optical disk 1 includes one that has a recording film mainly consisting of an organic dye formed on its surface, such as DVD-R, DVD+R, and CD-R, and a disk of a rewritable type that has a phase change recording film formed on its surface, such as DVD-RAM, DVD-RW, DVD+RW, CD-RW.

In the case of DVD-RAM, lands/grooves are formed beforehand on the disk; in the case of DVD-R, DVD+R, CD-R, DVD-RW, DVD+RW, CD-RW, etc., grooves are formed. Track pitches measure 0.615 μm for 2× format-compliant DVD-RAM disks, 0.74 μm for DVD-R/RW and DVD+R/RW disks, and 1.6 μm for CD-R/RW disks. As the laser diodes 22, one that generates red laser light with a wavelength of 650 nm for DVD optical disks and one that generates infrared laser light with a wavelength of 780 nm for CD optical disks are mounted on the optical head 2. The laser diode driver 25 drives the laser diodes according to the signals supplied from the DSP 4 and produces high-speed and high-output laser power. The slider 9 is driven by a stepping motor (not shown)

and moves the optical head 2 in a radial direction of the optical disk 1, hence enabling the optical head to perform high-speed access to the optical disk 1.

When in writing, the laser light emitted from the laser diode 22 is transformed into a parallel beam by the optical system, and then is irradiated on the optical disk 1 by the objective lens 21a while being focused to an light spot of a size of about $1 \times 10^{-6}$ m. At this time, in order to form a mark of a size of $0.5 \times 10^{-6}$ m or less on the recording film, the laser diode for DVDs is made to emit light at a power of $10 \times 10^{-3}$ or more; the laser diode for CDs is made to emit light at a power of $20 \times 10^{-3}$ W or more.

When reading is being performed, the laser diode 22 is driven at a relatively low output, the reflected light from the optical disk 1 is taken in with the objective lens 21a and is led to the OEIC 23 through the optical system 21, where the reproduced signal (RF signal) and the servo signal are detected. The objective lens 21a is mounted on the actuator, which is configured so that the objective lens 21a can always takes in a normal signal by the following procedures: a focus coil (not shown) is driven to absorb vertical movement of the optical disk 1; a tracking coil (not shown) is driven to enable the objective lens to track eccentricity of the optical disk 1; and a tilt coil (not shown) is driven to absorb relative inclination (tilt) of the optical disk 1 and the spindle motor 7. The signal detected by the OEIC 23 is led to an IC of the AFE 3 on the main board from the optical head 2 through FFC (Flexible Flat Cable) and the connector 8, and is also led to the laser diode driver 25. In the AFE 3, the operation part 31 conducts an operation to generate a reproduced signal of a high frequency (RF signal), the wobble signal, and the servo signal. The signal detected by the FMD 24 is not inputted into the AFE 3, but is led to the laser diode driver 25 and is used for power control.

During an operation of writing, a reflected light signal resulting from pulsed light that is making a mark can be obtained from the OEIC 23. A block of the operation part 31 detects a reproduction power level out of the reflected light signal and controls so that the amplitude of the reflected light signal at the time of writing becomes equal to that at the time of reading, whereby stabilization of the servo system is achieved. Regarding the signals from the FMD, a reproduction power level between the writing pulses and the writing pulse peak are detected during writing, and the detection results are led to the laser diode driver 25. The reproduced signal processing part 32 consists of an AGC circuit, a waveform equalization circuit, an LPF circuit, etc., and controls a signal from any of various kinds of CD optical disks and DVD optical disks so that it maintains a constant quality. Since the grooves and the lands/grooves of various disks are made undulated in a high frequency in advance, the wobble signal can be obtained by the same signal processing as that of the tracking signal. Although the frequency band of the tracking signal is 10 kHz at the highest, the wobble signal is approximately 315 kHz at the time of double-speed writing for DVD-RAM/R/RW disks, and is approximately 800 kHz for DVD+R/RW disks. Since the two signals differ from each other in frequency, normally the wobble signal is detected by a BPF circuit.

The RF signal, the wobble signal, and the servo signal that were detected by the AFE 3 are inputted into the DSP 4, respectively. In the DSP 4, the RF signal is led to the DSL/DPLL circuit 41, where the analog signal is binarized and subsequently is converted into a synchronized digital signal by a self-clocking type DPLL (Phase Locked Loop for Data). Then, the digital signal is led to a decoder for DVD or CD, and is generated as original data there. The generated data is sent to a personal computer (not shown) from the ATAPI circuit 52 through a connector 6 etc.

The wobble signal is transmitted to the RPLL (Phase Locked Loop for Reference Clock) circuit 44 and the LPP/ADIP circuit 43 in the DSP 4. The RPLL circuit 44 generates a reference clock for writing that is in synchronization with the wobble signal. The reference clock from the RPLL circuit 44 is led to a demodulator circuit in the DSP 4, i.e., a DVD/CD Decoder 42, at the time of writing. Moreover, the wobble signal of some optical disks, such as DVD-R/RW, contains LPP (Land Pre-Pit) that is address data, and the wobble signal of some optical disks, such as DVD+R/RW, similarly contains ADIP (Address In Groove) that is address data. The LPP/ADIP circuit 43 detects these address data (LPP, ADIP). The address data is used at the time of writing and at the time of reading.

The servo signal is inputted into the analog-to-digital converter 45 in the DSP 4. The analog-to-digital converter 45 binarizes the focusing signal, the tracking signal, etc. that are analog signals calculated by the AFE 3. Further, subsequently the servo circuit 46 performs digital processing on the signals. As the digital processing, amplification, phase compensation, addition, etc. are performed. In order that these digital signals drive the actuator again to exercise servo control, they are made to pass through the digital-to-analog converter 49, being led to the driver 10, and control and drive the driver 10. The driver 10 drives the actuator with the driving signals. Moreover, the sampling-timing signal generating circuit 48 is in the DSP 4, and outputs a timing signal, which is led to the operation part 31 of the AFE 3 in order to sample and hold the signal from the OEIC 23 and the signal from the FMD 24 with the writing clock of the RPLL circuit 44. The modulated data NRZI signal necessary to perform writing is supplied from the CD/DVD Encoder 51 to the laser diode driver 25, and a writing clock signal that is in synchronization with this signal is supplied from the RPLL circuit 44 to the CD/DVD Encoder 51. Furthermore, the RAM data required to generate the WR Strategy 253 in the laser diode driver 25 is sent to the laser diode driver 25 from the DSP 4 via the serial interface 47. Incidentally, the RAM data is sent from the microcomputer 11.

According to the first embodiment, since the optical disk apparatus is configured so that the analog detected signals from the optical head 2 are sampled/held and digitized in the optical head 2, and the digitized signals are transmitted using time-division multiplexing to the DSP 4 as a control part on the apparatus body side, the signals are less susceptible to impedance, noises, etc. and hence signal transmission with the waveform distortion suppressed becomes possible. Therefore, the apparatus becomes also capable of supporting high-speed writing and reading. In particular, since the sample and hold circuits 257, 258 and the analog-to-digital converter 259 are installed in the laser diode driver 25, a sampling-timing pulse without delay can be outputted from the laser diode driver 25, which also makes it much easier to implement supporting of high-speed writing and reading.

Figure 3:
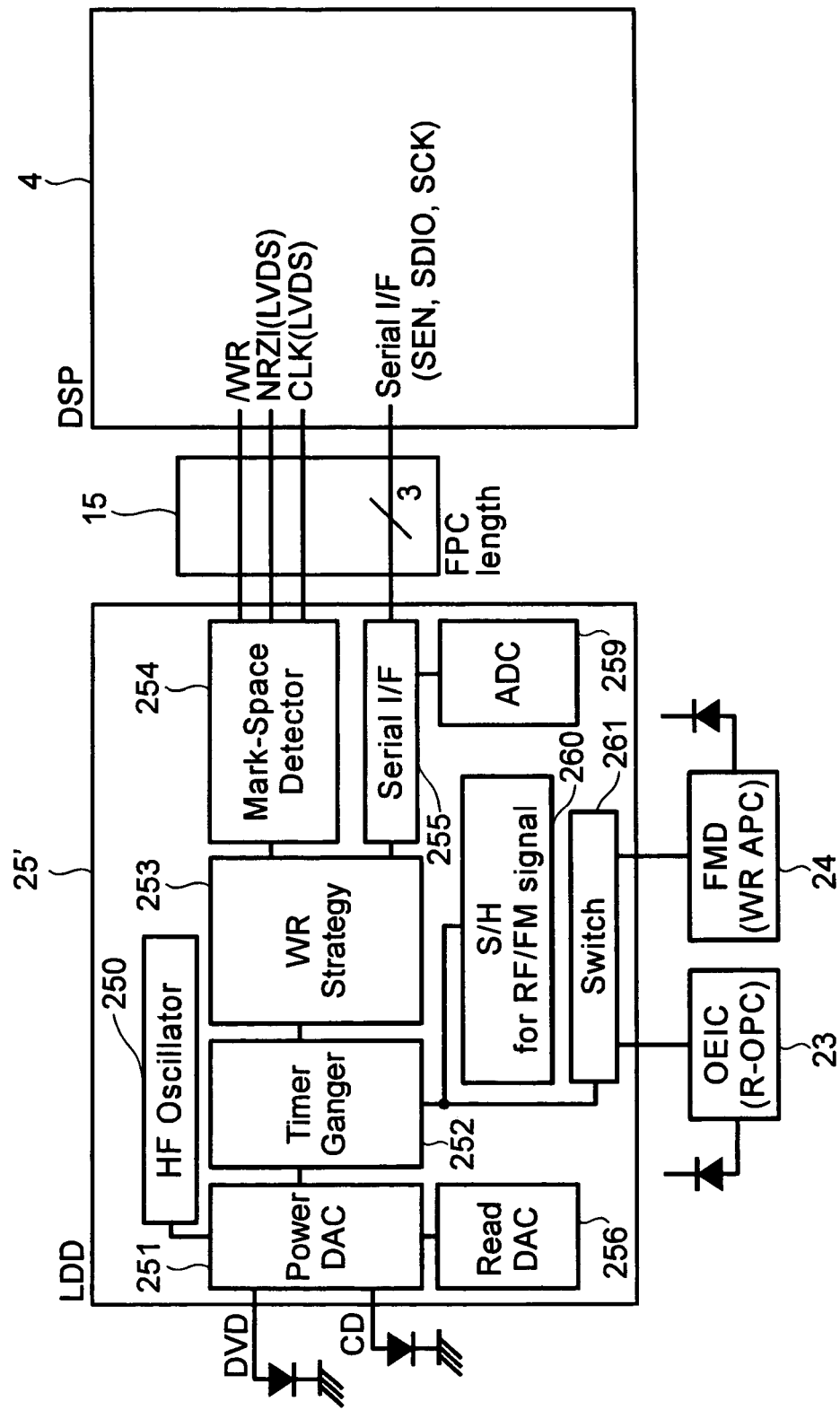
FIG. 3 shows an example of the circuit configuration in the optical head in the optical disk apparatus as a second embodiment of this invention.

FIG. 3 shows an example of the circuit configuration in the optical head in the optical disk apparatus as the second embodiment of this invention. This second embodiment is also an example in which a sample-and-hold circuit and an analog-to-digital converter circuit are installed in the laser diode driver, but is different from the first embodiment in a way that a sample-and-hold circuit for are produced signal and a sample-and-hold circuit for outputting a signal to a front monitor detection circuit (FMD) share a single shared circuit.

In FIG. 3, the numeral 25' is a laser diode driver, the numeral 260 is a sample and hold circuit that is shared for sampling and holding the reproduced signal from the OEIC 23 and for sampling and holding the output from the FMD 24, and the numeral 261 is a changeover circuit for changing over the reproduced signal and the output signal from the front monitor detector circuit (Switch circuit). Since configurations of other parts are the same as those of counterparts in the first embodiment, they are designated with the same reference numerals as in the first embodiment. Either of the signal from the OEIC 23 (OEIC (R-OPC)) and the signal from the FMD 24 (FMD (WR APC)) is switched by the changeover circuit 261, and is inputted into the sample and hold circuit 260. The change over is done according to a timing signal outputted from the Timer Ganger 252. When the reproduced signal is inputted from the OEIC 23, the sample and hold circuit 260 samples and holds the reproduced signal; when the signal from the FMD 24 is inputted, it samples and holds the signal. The signal (analog signal) that is sampled and held is inputted into the analog-to-digital converter 259, and is converted into a digital signal by the analog-to-digital converter 259. Functions and operations of other parts are the same as those of the first embodiment. The laser diode driver 25' is also constructed as a single IC in the optical head, and is incorporated in a single substrate together with the OEIC 23 and the FMD 24. The high frequency oscillator 250, the Power DAC 251, the Time Ganger 252 and the WR Strategy 253 correspond to the first circuit; the sample and hold circuit 260 corresponds to the second circuit; the analog-to-digital converter 259 corresponds to the third circuit; the OEIC 23 corresponds to the fourth circuit; the FMD 24 corresponds to the fifth circuit; and the changeover circuit 261 corresponds to the sixth circuit.

According to the second embodiment, as with the first embodiment, the signal is less susceptible to impedance, noises, etc. on the transmission path from the optical head 2 to the DSP 4 on the apparatus body side, the signal transmission with the waveform distortion suppressed becomes possible, which makes it possible to support the high-speed writing and reading in the optical disk apparatus. Moreover, since the sample and hold circuit 260 and the analog-to-digital converter 259 are installed in the laser diode driver 25', the laser diode driver 25 can generate the sampling-timing pulse without delay, which also makes it much easier to support high-speed writing and reading.

It should be noted that although each of the embodiments has a configuration in which the microprocessor 11 is installed outside the DSP 4, this invention is not limited to these configurations, that is, the microprocessor 11 may be installed inside the DSP 4 or may be installed in both the interior and the exterior of the DSP 4.

What is claimed is:

1. An optical disk apparatus for writing and/or reading information by allowing an optical head of the optical disk apparatus to irradiate laser light on an optical disk, comprising:
    an optical head including:
        a laser diode for generating the laser light;
        an optical system for focusing the laser light and irradiating the laser light on an information recording surface of the optical disk;
        an optical detecting part for receiving reflected laser light from the optical disk through the optical system, converting the reflected laser light into analog electric signals representing data including RF signals read from the optical disk, and outputting the analog electric signals including RF signals;
        a first circuit for driving the laser diode;
        a second circuit for sampling and holding the analog electric signals including unprocessed RF signals;
        a third circuit for converting the analog electric signals including RF signals that are sampled and held into digital signals, and for outputting the digital signals outside of the optical head; and
    a control part for receiving the digital signals from the optical head and forming control signals for the optical disk apparatus, the control part being located outside of the optical head.

2. An optical disk apparatus for writing and/or reading information by allowing an optical head of the optical disk apparatus to irradiate laser light on an optical disk, comprising:
    an optical head including:
        a laser diode for generating the laser light; an optical system for focusing the laser light and irradiating the laser light on an information recording surface of the optical disk;
        an optical detecting part for receiving reflected laser light from optical disk through the optical system, converting the reflected laser light into analog electric signals representing data including RF signals read from the optical disk, and outputting the analog electric signals including RF signals;
        a first circuit for driving the laser diode;
        a second circuit for sampling and holding the analog electric signals including unprocessed RF signals;
        a third circuit for converting the analog electric signals including RF signals that are sampled and held into digital signals; and a serial interface for time-division multiplexing the digital signals and for outputting the time-division multiplexed digital signals outside of the optical head; and
    a control part for receiving the digital signals from the optical head through the serial interface and forming control signals for the optical disk apparatus, the control part being located outside of the optical head.

3. The optical disk apparatus according to any one of the claims 1 and 2, wherein the first circuit, the second circuit, and the third circuit are constructed on a single substrate or in a single IC.

4. An optical head of an optical disk apparatus for writing and/or reading information by irradiating laser light on an optical disk, comprising:
    a laser diode for generating the laser light;
    an optical system for focusing and irradiating the laser light on the information recording surface of the optical disk;
    an optical detecting part for receiving reflected laser light from the optical disk through the optical system, converting the reflected laser light into analog electric signals representing data including RF signals read from the optical disk, and outputting the analog electric signals including RF signals;
    a first circuit for driving the laser diode;
    a second circuit for sampling and holding the analog electric signals; and
    a third circuit for converting the analog electric signals including unprocessed RF signals that are sampled and held into digital signals and for outputting the digital signals,
    wherein
        the optical head is configured to irradiate the laser light on the optical disk and transmit a representation of the data including RF signals detected from the reflected laser light to a control part of the optical disk apparatus after converting the data into digital signals, the control part being located outside of the optical head.

5. An optical head of an optical disk apparatus for writing and/or reading information by irradiating laser light on an optical disk, comprising:
   a laser diode for generating the laser light;
   an optical system for focusing the laser light and irradiating the laser light on an information recording surface of the optical disk;
   an optical detecting part for receiving reflected laser light from the optical disk through the optical system, converting the reflected laser light into analog electric signals representing data including RF signals read from the optical disk, and outputting the analog electric signals including RF signals;
   a first circuit for driving the laser diode;
   a second circuit for sampling and holding the analog electric signals including unprocessed RF signals;
   a third circuit for converting the analog electric signals including RF signals that are sampled and held into digital signals; and
   a serial interface for conducting time-division multiplexing of the digital signals and for transmitting the time-division multiplexed digital signals to a control part of the optical disk apparatus,
   wherein
      the optical head is configured to irradiate the laser light on the optical disk and transmit the time-division multiplexed digital signals to the control part of the optical disk apparatus, the control part being located outside of the optical head.

6. The optical head according to either of claim 4 or claim 5, wherein the first circuit, the second circuit, and the third circuit are constructed on a single substrate or in a single IC.

7. A detection signal processing method of an optical disk apparatus for writing and/or reading information by allowing an optical head to irradiate laser light on an optical disk, comprising the steps of:
   receiving reflected laser light from the optical disk and converting the reflected laser light into analog electric signals which include RF signals, the receiving being performed in an optical head;
   sampling and holding the analog electric signals which include unprocessed RF signals, the sampling and holding being performed in the optical head;
   converting the analog electric signals which include RF signals that are sampled and held into digital signals, the converting being performed in the optical head;
   transmitting the digital signals to a control part of the optical disk apparatus through a serial interface, the control part being located outside of the optical head; and
   receiving the digital signals from the optical head and forming control signals for the optical disk apparatus in the control part.

8. The optical disk apparatus according to claim 3 wherein the single IC is a laser diode driver.

9. The optical head according to claim 6 wherein the single IC is a laser diode driver.

* * * * *